UNITED STATES PATENT OFFICE.

LEO DAFT, OF RUTHERFORD, NEW JERSEY, ASSIGNOR TO ELECTRO-CHEMICAL RUBBER & MANUFACTURING COMPANY, A CORPORATION OF NEW JERSEY.

RUBBER-COATED METAL ARTICLE AND METHOD OF PRODUCING THE SAME.

1,120,795.  Specification of Letters Patent.  Patented Dec. 15, 1914.

No Drawing.  Application filed February 17, 1912.  Serial No. 678,364.

*To all whom it may concern:*

Be it known that I, LEO DAFT, a subject of the King of Great Britain, and a resident of Rutherford, in the county of Bergen, State of New Jersey, have invented a new and Improved Rubber-Coated Metal Article and Method of Producing the Same.

My invention relates to an improved rubber-coated metal article and the method of producing it by vulcanizing the rubber directly upon the metal of the article, or upon a metal surface conferred upon the article as by electro-deposition or otherwise.

This improved method of attaching the rubber to the metal and the article produced thereby is far superior to any of the prior methods used, such, for instance, as the mechanical methods by the use of gums, shellac, cement, etc., due to the fact that the adhesion between the rubber and the metal is a chemical bond or union whereby the article produced is much stronger than that which can be produced by these prior mechanical methods, and that the bond or union between the rubber and the metal does not deteriorate under service.

In my pending application, Serial No. 564,840, I have described and claimed one method and means of producing a chemical union between rubber and a metal by vulcanizing rubber to such metal provided the metal contains antimony.

My present invention consists essentially in the discovery that rubber may be directly combined by vulcanization with a metal provided that metal contains bismuth and provided the alloy does not contain tin to such extent that it is stannous or tinny in character. I have also discovered that due to the tendency of the bismuth in the metal to precipitate out of solution, the addition of arsenic to bismuth increases the efficiency of the process, and the article produced thereby. Hence by my present invention, rubber may be vulcanized directly upon a metal containing bismuth, or one containing bismuth and arsenic.

It will, of course, be understood that the rubber may be attached to a metal provided it has a surface containing bismuth or bismuth and arsenic, and it is therefore immaterial whether the entire article be formed of a metal containing these substances as by a casting or stamping, or whether the article is first made of some other metal and then has a surface containing these substances conferred upon it by electro-deposition, dipping, or otherwise.

If the article is to be made entirely of alloy containing bismuth, I prefer to use one containing copper, zinc and bismuth in the following proportions: copper, 60 parts; zinc, 37 parts; bismuth, 3 parts. Or, if arsenic is to be used together with the bismuth, then I prefer to use an alloy of copper, zinc, bismuth and arsenic in the following proportions: copper, 60 parts; zinc, 38 parts; bismuth, 1 part; arsenic, 1 part.

Where copper, zinc and bismuth alone are used, the alloy may be made by fusing the various metals. When, however, arsenic is to be added, I prefer to add it in the form of a powder, after the copper, zinc and bismuth have been fused, and then puddle the whole before pouring.

When it is desired to confer a surface of the alloy upon an article by electro-deposition, and where copper, zinc and bismuth alone are to be used, I prefer to make the electrolyte in the following manner: I first make an alloy of copper, zinc and bismuth in the proportions given above, and dissolve the same in a strong oxidizing agent, such as hot nitric acid (specific gravity 42 Baumé). This gives a light blue, turbid fluid which I neutralize by the addition of ammonia or other similar agent, thus producing a clear, dark blue solution to which I add sufficient potassium cyanid to clear the fluid and make the same strongly alkaline. The resulting liquid, after the addition of the potassium cyanid, is a light yellow. When, however, it is desired to confer a surface of the alloy upon an article by electro-deposition and when it is desirable to use arsenic as well as bismuth, I proceed in the same manner, dissolving the alloy in hot nitric acid and performing the same operations as in the case in which bismuth, copper and zinc alone are used. The liquid produced in either case is diluted with sufficient water to form the electrolyte, at about a specific gravity of 1.040. The article to which the rubber is to be attached is then placed in the electrolyte and electroplated in any preferred manner. I prefer to use a current of about .6 amperes per square decimeter of surface to be plated, at a voltage of from $3\frac{3}{4}$ to 6 volts, but these values may be varied within wide limits. The anodes used in each case consist of the alloy described above, viz. where copper, zinc and bismuth are used in the electrolyte, the anodes are: copper, 60 parts; zinc, 37 parts; bismuth, 3 parts; and where arsenic is used as well as bismuth, the anode I prefer to use is: copper, 60 parts; zinc, 38 parts; arsenic, 1 part; bismuth, 1 part. The article thus plated is then thoroughly cleaned and is brought into contact with the rubber and vulcanized under pressure at a high temperature, say 250° to 320° Fahrenheit.

I do not intend to confine myself to the exact proportions of the various ingredients set forth above, nor to the exact method of performing the various steps of the process, nor to the identical ingredients themselves. Many, if not all, of the ingredients have well known chemical equivalents, and equivalent reactions may be obtained. It is evident that many, if not all, of these things may be varied within relatively wide limits without departing from the spirit of my invention.

While I have described herein a process of attaching rubber to a metal by electroplating a surface thereon using an electrolyte containing either bismuth or bismuth and arsenic, and a method of making such electrolytes, yet I have not claimed the same herein as this forms the subject matter of another application filed by me concurrently with this application and bears Serial Number 678,365.

What I claim and desire to secure by United States Letters Patent is:

1. A new article of manufacture consisting of a metal article having a non-stannous surface containing bismuth, with a rubber covering vulcanized thereon.

2. A new article of manufacture consisting of a metal article having a non-stannous surface containing bismuth and copper, with a rubber covering vulcanized thereon.

3. A new article of manufacture consisting of a metal article having a non-stannous surface containing bismuth, copper and zinc, with a rubber covering vulcanized thereon.

4. A new article of manufacture consisting of a metal article having a surface containing bismuth, copper, zinc and arsenic, with a rubber covering vulcanized thereon.

5. The method of attaching rubber to metals which consists in bringing rubber containing a vulcanizing agent into engagement with an article having a non-stannous surface of an alloy of bismuth, and vulcanizing the rubber upon said surface.

6. The method of attaching rubber to metals which consists in bringing rubber containing a vulcanizing agent into engagement with an article having a surface of an alloy of bismuth and arsenic and vulcanizing said rubber upon said surface.

7. The method of attaching rubber to metals which consists in bringing rubber containing a vulcanizing agent into engagement with an article having a non-stannous surface of an alloy of bismuth and copper, and vulcanizing said rubber upon said surface.

8. The method of attaching rubber to metals which consists in bringing rubber containing a vulcanizing agent into engagement with an article having a non-stannous surface of an alloy of bismuth, copper and zinc, and vulcanizing said rubber upon said surface.

9. The method of attaching rubber to metals which consists in bringing rubber containing a vulcanizing agent into engagement with an article having a surface of an alloy of bismuth, copper, zinc and arsenic and vulcanizing said rubber upon said surface.

10. The method of attaching rubber to metals which consists in depositing a bismuth alloy upon the metal, bringing rubber containing a vulcanizing agent into engagement with the surface thus treated, and vulcanizing said rubber upon said surface.

11. The method of attaching rubber to metals which consists in depositing an alloy of bismuth and copper upon the metal, bringing rubber containing a vulcanizing agent into engagement with the surface thus treated, and vulcanizing said rubber upon said surface.

12. The method of attaching rubber to metals, which consists in depositing an alloy of bismuth, copper and zinc upon the metal, bringing rubber containing a vulcanizing agent into engagement with the surface thus treated, and vulcanizing said rubber upon said surface.

13. The method of attaching rubber to metals, which consists in depositing an alloy of bismuth, copper, zinc and arsenic upon the metal, bringing rubber containing a vulcanizing agent into engagement with the surface thus treated and vulcanizing said rubber upon said surface.

14. A new article of manufacture consisting of a metal article having a surface containing three parts of bismuth and sixty parts of copper and thirty-seven parts of zinc, with a rubber covering vulcanized thereon.

In witness whereof I have hereunto signed my name in the presence of two witnesses.

LEO DAFT.

Witnesses:
WALTER S. JONES,
MARGARET MacINTYRE.